(12) United States Patent
Bartling et al.

(10) Patent No.: US 11,429,515 B1
(45) Date of Patent: Aug. 30, 2022

(54) MONITORING EXECUTION OF SOFTWARE USING PATH SIGNATURE

(71) Applicant: Arm Limited, Cambridge (GB)

(72) Inventors: Michael Bartling, Austin, TX (US); Hugo John Martin Vincent, Cambridge (GB); Brendan James Moran, Histon (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 17/319,228

(22) Filed: May 13, 2021

(51) Int. Cl.
*G06F 11/36* (2006.01)
*G06F 21/78* (2013.01)
*G06F 21/53* (2013.01)
*G06F 21/60* (2013.01)

(52) U.S. Cl.
CPC ...... *G06F 11/3688* (2013.01); *G06F 11/3676* (2013.01); *G06F 11/3692* (2013.01); *G06F 21/53* (2013.01); *G06F 21/602* (2013.01); *G06F 21/78* (2013.01)

(58) Field of Classification Search
None
See application file for complete search history.

(56) References Cited

U.S. PATENT DOCUMENTS

| | | | | |
|---|---|---|---|---|
| 7,320,125 | B2 * | 1/2008 | Elliott | G06F 11/3466 717/124 |
| 9,674,215 | B2 * | 6/2017 | Martini | H04L 63/1433 |
| 2018/0285567 | A1 * | 10/2018 | Raman | G06F 21/566 |
| 2019/0138542 | A1 * | 5/2019 | Van Beest | G06F 16/9024 |
| 2020/0187071 | A1 * | 6/2020 | Chen | H04W 36/0083 |

OTHER PUBLICATIONS

Wang, "Hashing for Similarity Search: A Survey", 2014, ar.Xiv.org (Year: 2014).*
Wang et al., "Hashing for Similarity Search: A Survey", arXiv preprint arXiv: 1408.2927, 2014—arxiv.org, Aug. 13, 2014, 29 pages.
Giusti et al., "Iterated Integrals and Population Time Series Analysis", Topological Data Analysis, Apr. 27, 2019, 24 pages.

* cited by examiner

*Primary Examiner* — Hossain M Morshed
(74) *Attorney, Agent, or Firm* — Nixon & Vanderhye P.C.

(57) ABSTRACT

Techniques, supported by corresponding apparatuses and methods, are disclosed for monitoring execution of software in a trusted environment and generating path signatures which are characteristic of the behaviour of the software. Multiple approximate nearest neighbour searching hash tables are generated in dependence on such path signatures and on attribute information defining behavioural classifications for the path signatures. Later execution of the software in a non-trusted environment is monitoring and an observed path signature characteristic of the behaviour of the software is generated. This observed path signature is queried against the multiple approximate nearest neighbour searching hash tables and a behavioural classification is determined in dependence on hash collision-based similarity between the observed path signature and the content of the multiple approximate nearest neighbour searching hash tables.

20 Claims, 12 Drawing Sheets

MONITORING EXECUTION OF SOFTWARE USING PATH SIGNATURE

TECHNICAL FIELD

The present disclosure relates to data processing. In particular, the present disclosure relates to monitoring the execution of software using path signatures.

DESCRIPTION

Software execution may be monitored to determine if that execution is considered to be normal or whether something unusual appears to be happening. For example malware detection techniques may be used to determine if there are indications that a malicious actor is attempting to disrupt or corrupt the software execution and for purposes other than those intended by the programmer and end-user. However due to the complexity of contemporary software, it can be difficult to succinctly define what is normal and what is abnormal. Moreover correct, but rare, behaviours of the software may be misidentified by the monitoring as malicious and incorrectly categorised as such. These false positive identifications would ideally be reduced to a minimal level.

SUMMARY

One example described herein is an apparatus comprising:
event capturing circuitry to monitor execution of software in a trusted environment and to generate a series of event data in dependence on the execution of the software;
path signature generation circuitry to generate a path signature dependent on the series of event data and dependent on attribute information defining a behavioural classification for the path signature; and
hashing circuitry to generate multiple approximate nearest neighbour searching hash tables in dependence on the path signature.

Another example described herein is a method of data processing comprising:
monitoring execution of software in a trusted environment;
generating a series of event data in dependence on the execution of the software;
generating a path signature dependent on the series of event data and dependent on attribute information defining a behavioural classification for the path signature; and
generating multiple approximate nearest neighbour searching hash tables in dependence on the path signature.

Another example described herein is an apparatus comprising:
event capturing circuitry to monitor execution of software in a non-trusted environment and to generate a series of event data in dependence on the execution of the software;
path signature generation circuitry to generate an observed path signature from the series of event data;
hash table storage configured to store multiple approximate nearest neighbour searching hash tables previously generated in dependence on path signatures generated when the software was executed in a trusted environment and on attribute information defining behavioural classifications for the path signatures; and
hash query circuitry to query the multiple approximate nearest neighbour searching hash tables with the observed path signature and to indicate a behavioural classification of the observed path signature in dependence on hash collision-based similarity between the observed path signature and content of the multiple approximate nearest neighbour searching hash tables.

Another example described herein is a method of data processing comprising:
monitoring execution of software in a non-trusted environment;
generating a series of event data in dependence on the execution of the software;
generating an observed path signature from the series of event data;
querying with the observed path signature multiple approximate nearest neighbour searching hash tables previously generated dependent on path signatures generated when the software was executed in a trusted environment and dependent on attribute information defining behavioural classifications for the path signatures; and
indicating a behavioural classification of the observed path signature in dependence on hash collision-based similarity between the observed path signature and content of the multiple approximate nearest neighbour searching hash tables.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
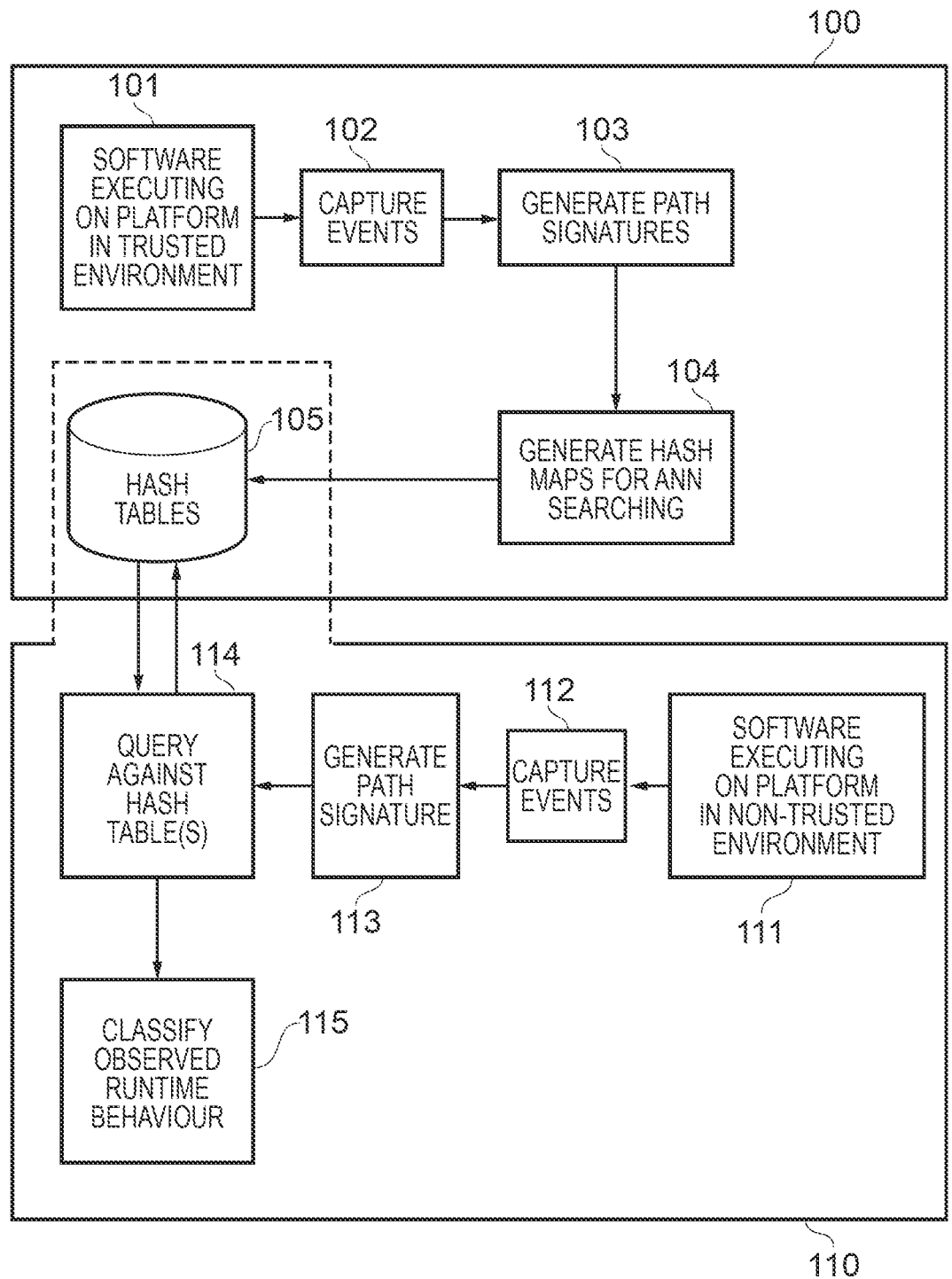
FIG. 1 schematically illustrates apparatus according to some example embodiments for firstly observing software executing in a trusted environment and subsequently monitoring execution of that software in a non-trusted environment.

Before discussing the embodiments with reference to the accompanying figures, the following description of embodiments is provided.

In accordance with one example configuration there is provided an apparatus comprising:

event capturing circuitry to monitor execution of software in a trusted environment and to generate a series of event data in dependence on the execution of the software;

path signature generation circuitry to generate a path signature dependent on the series of event data and dependent on attribute information defining a behavioural classification for the path signature; and hashing circuitry to generate multiple approximate nearest neighbour searching hash tables in dependence on the path signature.

The present techniques are based on the realisation that path signatures, constructs which stem from algebraic topology as an approach to analysing stochastic differential equations, can be a useful tool for time series classification tasks, in particular here for characterising behavioural signatures when software is executed (and these may be characteristic of known benign behaviour or of known malicious behaviour). Mathematically speaking, path signatures are invariant to shifts and functional re-parameterisations of the time series. They have various attractive features, such as that they can capture a high degree of non-linearity in the signals they are based on. Accordingly the present techniques disclose the use of path signatures in order to generate and store behavioural signatures which correspond to either acceptable run-time behaviour (when the software is executing normally) or to suspect run-time behaviour, where such malicious signatures are captured by trusted entity, intentionally mimicking malicious software usage or intervention, in order to allow this to be later identified. These path signatures, including attribute information defining their respective behavioural classifications, then form a corpus of trusted knowledge to be used for the future observation and behavioural classification of software execution. It will be recognised that these path signatures will be specific to the software being executed and may be specific to the platform on which that software is executed.

Furthermore, where the present techniques further recognise that it is not feasible to capture path signatures corresponding to all possible control flows which executing software might follow, or indeed to capture path signatures corresponding to all possible malicious activity, the present techniques disclose an approach according to which the path signatures are hashed to generate multiple hash tables and using which approximate nearest neighbour searching is carried out, allowing an observed path signature to be classified in dependence on hash collision-based similarity between the observed path signature and the content of the hash tables. Accordingly observed path signatures corresponding to software execution control flows which have not previously been observed can nevertheless be labelled with a behavioural classification, in particular as benign or malicious, on the basis of the "proximity" of the path signature to previously observed path signatures within the hash space onto which they are projected. This proximity may be determined in a variety of ways, but in some examples "locality sensitive hashing" (LSH) techniques are employed. There are a range of ways in which LSH may be implemented, though for clarity and brevity the present description is based on LSH with p-stable distributions.

The execution of the software in the trusted environment and the capturing of path signatures may be carried out in a variety of ways. However according to some examples the apparatus further comprises:

test administration circuitry to perform a test of execution of the software in the trusted environment, wherein the test comprises:

causing the event capturing circuitry to generate a time-window-specific series of event data in dependence on the execution of the software for a selected time window during execution of the software;

causing the path signature generation circuitry to generate a time-window-specific path signature from the time-window-specific series of event data and further comprising test-specific attribute information defining a behavioural classification for the test;

and path signature storage configured to store the time-window-specific path signatures generated by the path signature generation circuitry.

The duration of the time windows in which the event capturing circuitry captures the series of event data is not limited and may be arbitrarily chosen according to the implementation of the present techniques. Nevertheless it may be chosen for these time windows to be relatively short, for example (in the context of contemporary data processor architectures) having a duration of 25 processor cycles, or may be defined in a time duration such as 25 microseconds. Alternatively, a window may be defined as a fixed number of events; for example, 25 events with associated time stamps. Accordingly it will be understood that behavioural classifications may be associated with path signatures generated over relatively short periods, and thus that a useful fine granularity of behavioural classification is supported, such that even a brief or transient malicious activity may be identified. Moreover, it should be understood that the event data, of which a series is generated by the event capturing circuitry on the basis of monitoring the execution of software, represent snapshots of monitored quantities of relevance to the execution of the software, where these monitored quantities may be continually varying or may evolve in discrete steps. Some monitored quantities may be generated at discrete points in time, whereas others may be continually generated. In the present context an "event" is therefore characterised by being a snapshot of the monitored quantities at a time point selected by the event capturing circuitry, rather than being a particular occurrence in and of itself.

Furthermore the test administration circuitry may define the time windows in which path signatures should be captured in a variety of ways and those time windows may have any relationship with one another (e.g. distinct, overlapping, adjacent, regularly spaced, irregularly spaced and so on). However according to some examples the test administration circuitry is configured to perform the test of execution of the software in the trusted environment for a sliding time window during execution of the software, wherein the event capturing circuitry is configured to generate a sequence of time-window-specific series of event data for a sequence of selected time windows and the path signature generation circuitry is configured to generate a sequence of time-window-specific path signatures, and the path signature storage is configured to store the time-window-specific path signatures in association with test-specific attribute information defining a behavioural classification for the test.

The test administration circuitry may perform any number of tests as appropriate to the purpose of seeking to capture path signatures with an appropriate range of code coverage. In some examples the test administration circuitry is configured to perform multiple tests, wherein the multiple tests are associated with a range of behavioural classifications. Accordingly some tests may be associated with benign software execution whilst other tests may be associated with known malicious activity. Nevertheless "benign" and "malicious" may not be the only behavioural classifications which are used, and these categories may be subdivided in particular in terms of a pre-defined type of response which should be implemented when such behaviour as observed, for example (at the more drastic end of the spectrum) to cause a fault to be generated such that normal software execution is aborted, to cause an error message to be generated without interrupting the software execution, and to indicate (possibly by the absence of any message generation) that the currently observed behaviour is considered normal/benign.

Accordingly in some examples the test administration circuitry is configured to cause the path signature storage to store the time-window-specific path signatures in association with a behaviour response indication for the test. Thus when behaviour which appears to correspond to that test is observed, the behaviour response indication can be retrieved in order to guide the appropriate reaction.

The present techniques further recognise that on the one hand the greater the number of elements a path signature has the more precisely it may capture the particular behaviour it represents. However on the other hand the greater the number of elements a path signature has, the more complex the hashing comparison and the longer the hash look up times. In view of this, in some examples the hashing circuitry comprises: band mapping circuitry to perform a banding process on the path signature to map a subset of elements of the path signature into a path band according to a predefined mapping, wherein the band mapping circuitry is configured to perform multiple versions of the banding process using multiple predefined mappings to generate multiple path bands, and wherein the hashing circuitry is configured to generate the multiple approximate nearest neighbour searching hash tables by hashing function to the multiple path bands.

Accordingly the projection of a path signature into a path band, effectively taking a lower dimensional "slice" through the space inhabited by the greater dimensional path signature, and where multiple such path bands are generated, produces a reduced size representation of the path signature, which nevertheless (when multiple unrelated projections are used to generate the multiple path bands) provides a unique "fingerprint" for that path signature and accordingly for the behaviour it represents. The use of this reduced size representation thus reduces the size of the corresponding hash tables, reduces the complexity of the hashing comparison, and speeds up the hash look up times.

The set of mappings which are used for the multiple path bands may be generated in a variety of ways but in some examples the multiple predefined mappings are randomly generated as an initialisation step and are thereafter used by the hashing circuitry to generate the multiple approximate nearest neighbour searching hash tables.

Further, in some examples the test administration circuitry is configured to cause the multiple approximate nearest neighbour searching hash tables to be stored in association with the multiple predefined mappings. Accordingly the multiple predefined mappings may then be readily retrieved and used to configure hash query circuitry.

Further, in some examples the test administration circuitry is configured to cause the multiple approximate nearest neighbour searching hash tables to be stored in association with event capturing configuration data. Thus when the hash tables are later to be used to classify behaviour of software executing in a non-trusted environment, the event capturing configuration data can be used to set up the event capturing circuitry which is going to be used to monitor the execution of the software in that non-trusted environment.

The event capturing circuitry may be variously configured but in some examples the event capturing circuitry comprises event aggregation buffers to aggregate event counts over predetermined sampling periods, and the series of event data comprises a series of aggregated event counts.

The path signature generation circuitry may be configured in a variety of ways but in some examples the path signature generation circuitry is configured to interpolate between data items of the series of event data to generate any missing data items in the series of event data. Generally path signature computation requires equi-sampled events, and thus this enables "missing" entries at the required sample intervals to be provided.

In accordance with one example configuration there is provided a method of data processing comprising:
monitoring execution of software in a trusted environment;
generating a series of event data in dependence on the execution of the software;
generating a path signature dependent on the series of event data and dependent on attribute information defining a behavioural classification for the path signature; and
generating multiple approximate nearest neighbour searching hash tables in dependence on the path signature.

Thus the present techniques disclose provision of apparatuses and methods which can be used to monitor the execution of software in a trusted environment and to generate a set of hash tables which represent known behaviours of the software in execution (whether these are benign or malicious). The intention of generating this set of hash tables is that they may then be provided in association with the software, such that when the software is executed in a non-trusted environment its behaviour may be monitored, through the use of event capturing and path signature generation, so that path signatures representative of the software's behaviour can then be compared against these hash tables and classified (for example as benign or malicious). The present techniques are not limited to the particular type of software or the particular type of platform on which it might be executed, but merely for the sake of illustration one example could be the development of an app intended for distribution via one of the known "app stores" for installation on an end user mobile device, where the present techniques envisage the provision of that app in association with the above described hash tables, and wherein the end user mobile device is configured to monitor execution of the app with reference to those hash tables, such that its behaviour can be monitored and (where appropriate) reacted to.

In accordance with one example configuration there is provided an apparatus comprising:

event capturing circuitry to monitor execution of software in a non-trusted environment and to generate a series of event data in dependence on the execution of the software;

path signature generation circuitry to generate an observed path signature from the series of event data;

hash table storage configured to store multiple approximate nearest neighbour searching hash tables previously generated in dependence on path signatures generated when the software was executed in a trusted environment and on attribute information defining behavioural classifications for the path signatures; and hash query circuitry to query the multiple approximate nearest neighbour searching hash tables with the observed path signature and to indicate a behavioural classification of the observed path signature in dependence on hash collision-based similarity between the observed path signature and content of the multiple approximate nearest neighbour searching hash tables.

The hash query circuitry may be configured in a variety of ways, but in some examples the hash query circuitry comprises:

band mapping circuitry to perform a banding process on the observed path signature to map a subset of elements of the observed path signature into an observed path band according to a predefined mapping, wherein the band mapping circuitry is configured to perform multiple versions of the banding process using multiple predefined mappings to generate multiple observed path bands, and wherein the hashing circuitry is configured to receive the multiple predefined mappings in association with the multiple approximate nearest neighbour searching hash tables.

Further to the description above of this technique of the projection of a path signature into a path band, this allows the observed path signature to be "fingerprinted" in a manner which corresponds to the path bandings used to generate the content of the hash tables against which the observed path signature will be compared, in a manner which is computationally less burdensome and is faster due to the shorter hash look-up times. This approach may therefore be of particular application in the context of the above described (merely exemplary) situation of the non-trusted environment in which the software execution is monitored being on a mobile device.

The hash query circuitry may determine the hash collision-based similarity in a variety of ways, but in some examples the hash query circuitry is configured to determine the hash collision-based similarity in dependence on a collision count of hash collisions between the observed path signature and a multiplicity of the multiple approximate nearest neighbour searching hash tables. Appropriate thresholds may be set against which the collision count may be compared in absolute terms or the determination may be made on the basis of an approximated Jaccard similarity (i.e. intersection/union), which here may be represented by the collision count divided by the number of hash tables.

In some examples the hash query circuitry is configured to indicate the behavioural classification of the observed path signature in dependence on the collision count. For example, in some examples the hash query circuitry is configured to indicate the behavioural classification as positive identification when the collision count exceeds a first count threshold and to indicate the behavioural classification as non-identification when the collision count is below a second count threshold. The first and second count thresholds may be the same or may differ.

The classification of the behaviour of the executing software may be determined with reference to a plurality of tests which were indicative of a particular type of behaviour. Thus in some examples the hash query circuitry is configured to determine a multiple identifier count from hash collisions found between the observed path signature and contents of the multiple approximate nearest neighbour searching hash tables, wherein the multiple identifier count indicates numbers of duplicate test identifiers for the hash collisions, and to indicate the behavioural classification of the observed path signature in dependence on the multiple identifier count.

Hence where the observed path signature generates multiple hash collisions with hash table content which is indicated to correspond to multiple test configurations for a particular behaviour type (i.e. benign or malicious), this information may be used in order to generate the behavioural classification. Thus, to take one example, in a situation when hash collisions are found which predominately correspond to malicious behaviour example tests, then even if other, fewer hash collisions are found which correspond to benign behaviour example tests, the observed path signature may cause a behavioural classification indicative of malicious behaviour. Equally, it will be appreciated that the inverse, i.e. predominantly, but not exclusively, benign behaviour matches driving a behavioural classification indicative of benign behaviour.

Accordingly in some examples the hash query circuitry is configured to indicate the behavioural classification of the observed path signature in further dependence on attribute information defining behavioural classifications for the path signatures stored in the multiple approximate nearest neighbour searching hash tables.

In accordance with one example configuration there is provided a method of data processing comprising:

monitoring execution of software in a non-trusted environment;

generating a series of event data in dependence on the execution of the software;

generating an observed path signature from the series of event data;

querying with the observed path signature multiple approximate nearest neighbour searching hash tables previously generated dependent on path signatures generated when the software was executed in a trusted environment and dependent on attribute information defining behavioural classifications for the path signatures; and indicating a behavioural classification of the observed path signature in dependence on hash collision-based similarity between the observed path signature and content of the multiple approximate nearest neighbour searching hash tables.

Particular embodiments will now be described with reference to the figures.

FIG. 1 illustrates an apparatus 100 and an apparatus 110 in accordance with one example embodiment. The apparatus 100 is operated by a trusted entity in order to monitor the behaviour of a selected item of software and to generate path signatures and, from the path signatures, hash tables which capture a representation of the behaviour of the executing software. Accordingly the figure illustrates software 101 executing on a platform in this trusted environment. Event capturing circuitry 102 is provided which generates a series of event data representative of the behaviour of the software. Path signature generation circuitry 103 takes the series of event data captured and generates path signatures therefrom. Hashing circuitry 104 then generates content for multiple hash tables on the basis of each path signature produced, these multiple hash tables then being stored in hash table storage 105.

Apparatus 110 is not necessary operated by a trusted entity (although it may be) and generally for the understanding of the present techniques is considered to provide a non-trusted environment for the execution of software. FIG. 1 shows the same software 111 as was previously executed under the control of the apparatus 100 now executing in the non-trusted environment of the apparatus 110. The apparatus 110 is configured in a corresponding manner to the apparatus 100 in terms of its event capturing circuitry, its path signature generation circuitry, and for some aspects of its hashing circuitry. Accordingly path signatures are generated on the basis of the execution of the software 111 in a corresponding manner to the way that the path signatures were generated in the apparatus 100. Thus event capturing circuitry 112 generates a series of observed event data which is representative of the execution behaviour of the software 111. Path signature generation circuitry 113 takes the series of observed event data captured and generates an observed path signature therefrom. Hashing circuitry 114 then hashes the observed path signature and queries this against the content of the multiple hash tables 105, which were generated and populated by the apparatus 100. For the purpose of indicating the use by the apparatus 110 of the hash tables 105 generated by the apparatus 100, only one set of hash tables 105 is illustrated in FIG. 1. However it should be appreciated that in many implementations the hash tables 105 generated by the apparatus 100 will be copied and distributed in association with the software, such that apparatus 110 in fact will have its own copy of those hash tables. On the basis of the approximate nearest neighbour (ANN) searching carried out by the hash query circuitry 114 of the observed path signature against the content of the hash tables 105, a similarity between the observed path signature and those path signatures used to generate the content of the hash tables 105 is determined based on hash collisions, and this similarity metric determines the output of behavioural classification circuitry 115, which indicates the determined behavioural classification of the current execution of the software 111.

Figure 2:
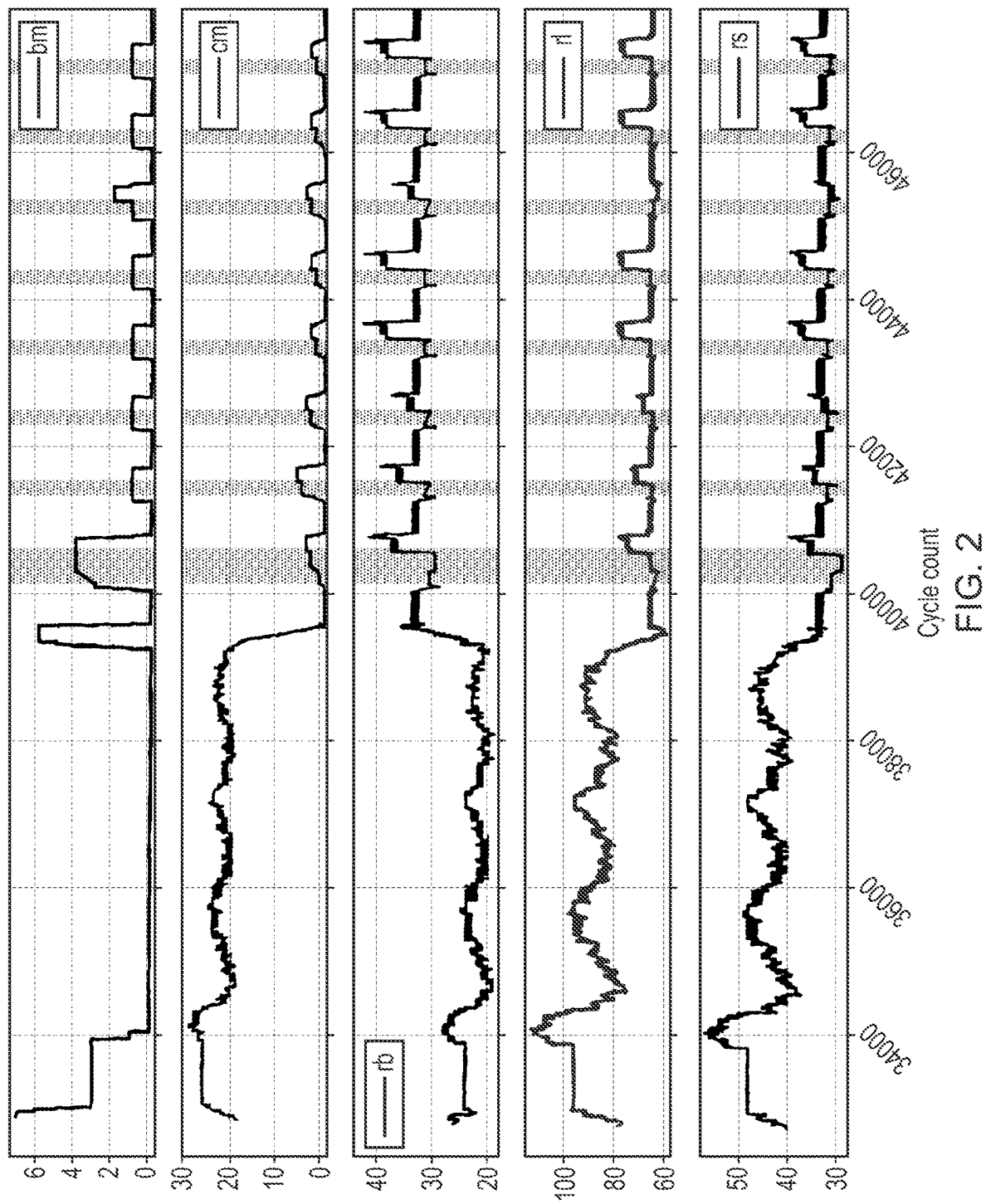
FIG. 2 shows the time evolution of an example set of monitored quantities when software is executing, from which series of event data may be derived and on the basis of which path signatures maybe generated according to some example embodiments.

FIG. 2 shows the time evolution of an example set of monitored quantities when software is executing in a test conducted by a trusted entity, from which series of event data may be derived and on the basis of which path signatures maybe generated according to some example embodiments. The respective event data variables (given the arbitrary labels: bm, cm, rb, rl, and rs) in the figure, may be captured by the event capturing circuitry in various ways. In the example illustrated these events (generated by a performance monitoring unit) are captured for each test conducted in a sliding time window. Event aggregators are used to aggregate over short, fixed time sample intervals (e.g. for the example illustrated over 25 cycles). Shaded bands are shown in the figure, which in this example corresponds to particular types of behaviour which may be desirable to flag in the data generated. For each test completed by the trusted entity a unique identifier in the test as well as a behavioural result code (e.g. "expected" or "assert") is stored in association with a classification label (e.g. "fault", "fail", "error handling", "pass") and a list of the path signatures generated.

Figure 3:
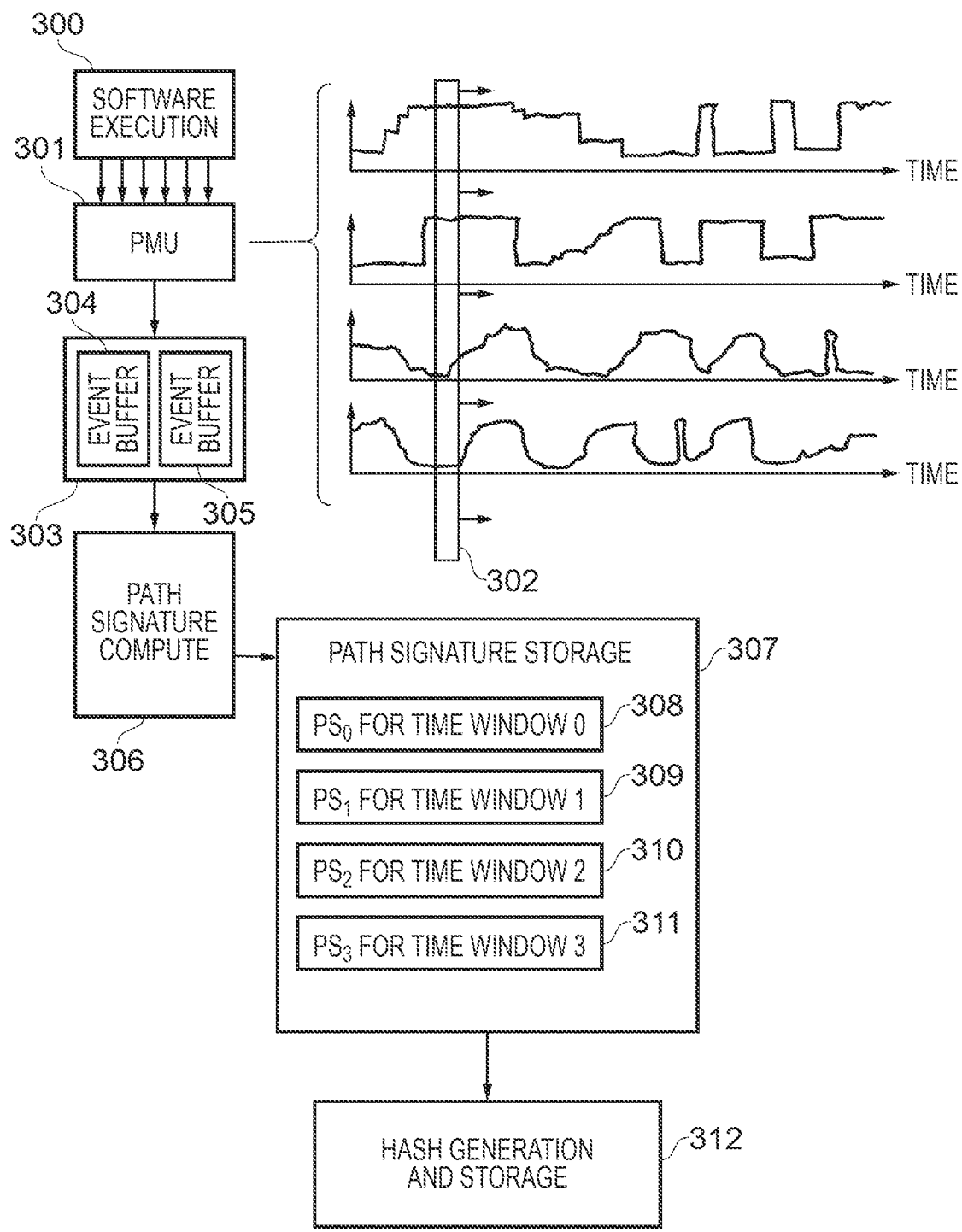
FIG. 3 schematically illustrates apparatus for monitoring the execution of software, for the generation of path signatures on the basis of events captured, and for populating hash tables on the basis of those path signatures according to some example embodiments.

FIG. 3 schematically illustrates components within a trusted entity carrying out execution of software for which behavioural signatures are being captured. The executing software 300 is connected to a performance monitoring unit 301, within which a set of monitored quantities (such as those illustrated in FIG. 2) are tracked and a sliding time window 302 captures data indicative of these events. Captured values are buffered in an event buffer structure 303, which in the example of FIG. 3 is shown with twin buffers 304 and 305 in a ping-pong configuration, wherein event data are fed into one of these buffers until it is full, at which point this triggers its processing, and the path signature computation circuitry 306 extracts a path signature from the full buffer. In the meantime, event data are fed into the other buffer of the pair. The path signature computation circuitry 306 stores the path signatures into path signature storage 307, which is illustrated in FIG. 3 with example content of path signatures 308-311 each corresponding to a respective time window. From path signatures storage 307 the path signatures are then passed to the hash generation and storage circuitry 312, more detail of which will be discussed with reference to the figures which follow.

Figure 4:
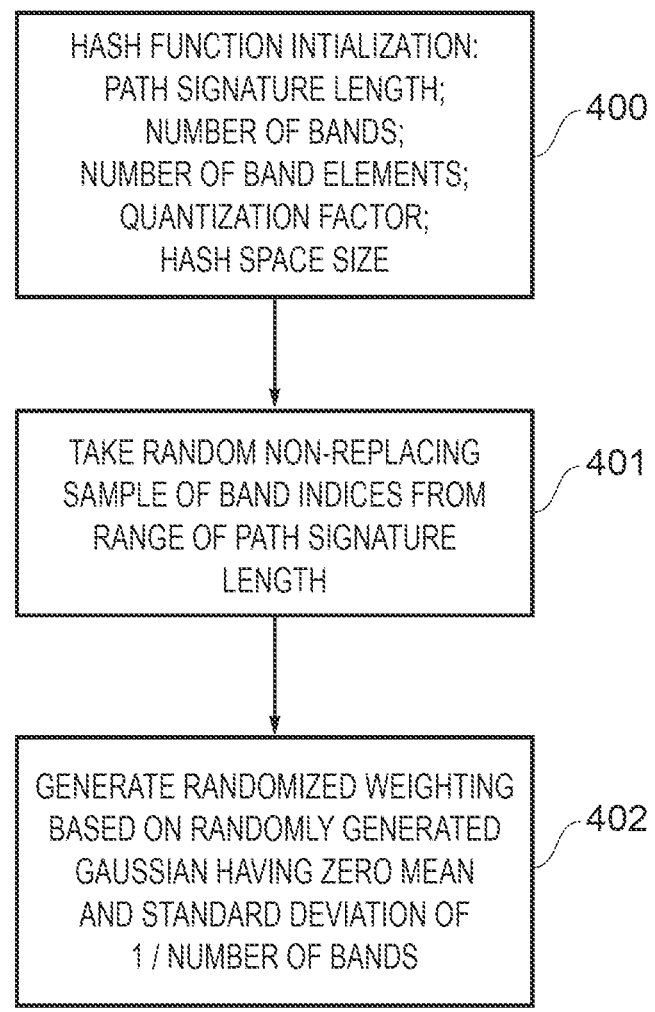
FIG. 4 shows a sequence of steps which are taken when initialising a hash function used in some example embodiments.

FIG. 4 is a flow diagram showing a sequence of steps which are taken when the apparatus generating the path signatures and hash table content on the basis of the software executing in the trusted environment is in an initialisation phase, in particular it shows the manner in which the hash function to be used is initialised. At the first step 400 of the initialisation, some parameters for the hash function are defined, these being the path signature length, the number of bands to be used, the number of elements within each band, a quantisation factor, and the hash space size. Then at step 401 the bands to be used are defined, where this process comprises taking a random, non-replacing sample of elements (multiplicity of which is given by the defined number of elements within each band) from the range of the path signature length. In other words a random subset of elements of the path signatures will then be used for each band. This random selection of elements is performed for each band. Then at step 402 a randomised weighting to be used in the hash function is generated based on a randomly generated Gaussian having zero mean and a standard deviation given by the inverse of the number of bands.

Figure 5:
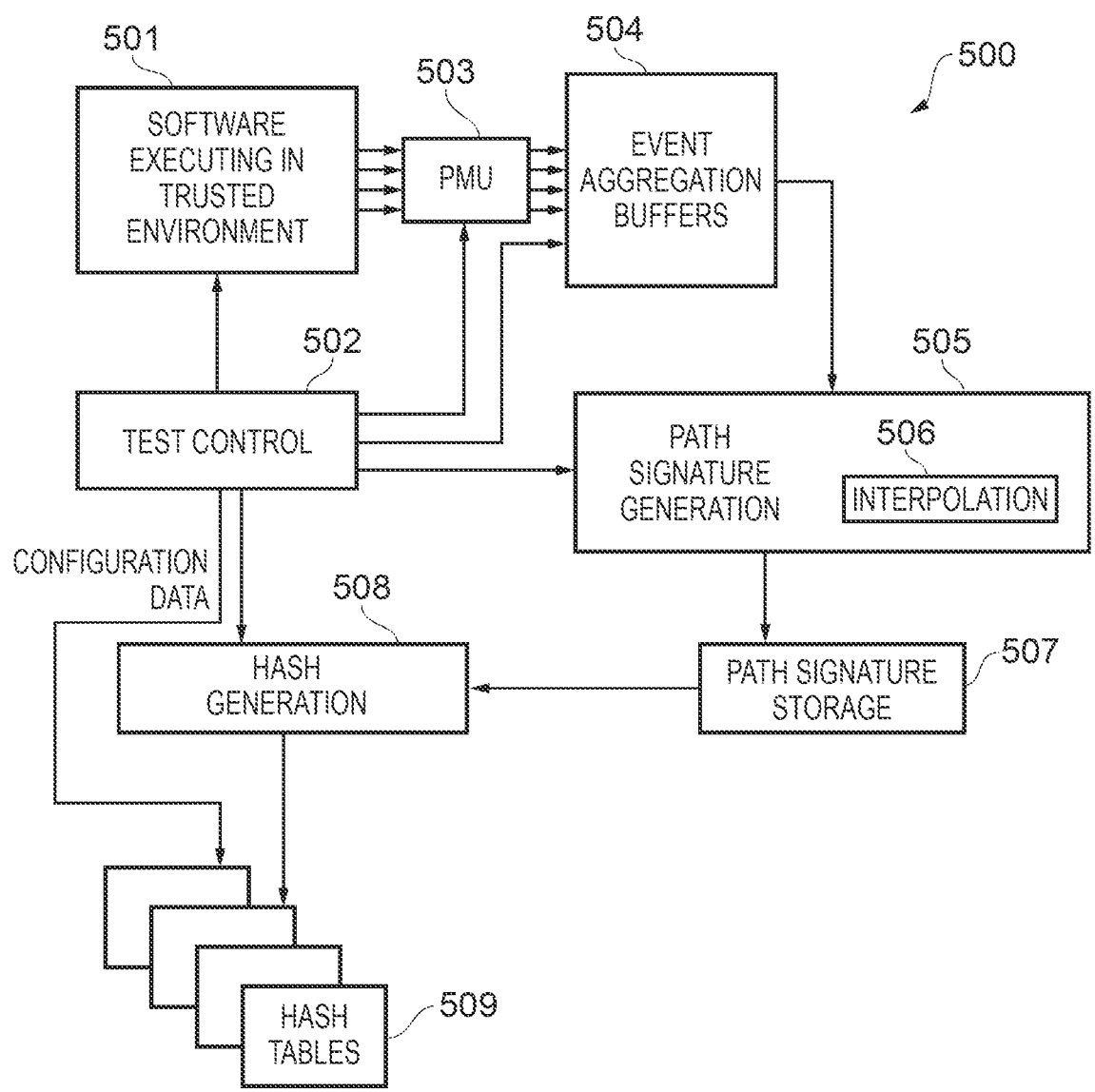
FIG. 5 schematically illustrates apparatus according to some example embodiments for monitoring the execution of software in a trusted environment and generating hash table content on the basis of the trusted execution.

FIG. 5 schematically illustrates apparatus 500 according to some example embodiments for monitoring the execution of software in a trusted environment and generating hash table content on the basis of the trusted execution. Accordingly apparatus 500 is a trusted entity and is operated under control of a user seeking to characterise the behaviour signatures of software 501 executing in this trusted environment. In order to capture many useful behavioural signatures the apparatus is provided with test control circuitry 502, which has control over the data and control inputs to the software 501, such that it can cause a range of tests to be carried out which not only characterise normal behaviour of the software which is frequently observed, but also corner cases of control flow and data input in response to which the software may exhibit unusual, but nonetheless benign behavioural patterns. In essence as long as the hash tables have the capacity to store entries representative of the software behaviour, the more permutations of configuration in which the software is operated in this test environment the better its behaviour when executed in a non-trusted environment can be correctly classified. The test control circuitry 502 also configures the setup of the performance monitoring unit 503, the event aggregation buffers 504, the path signature generation circuitry 505, and the hash generation circuitry 508. Configuration data indicative of the configurations of these components are stored in association with the hash tables 509. Accordingly when the hash tables 509 are provided in association with this configuration data, the recipient system can configure its event capturing, path signature generation, and hashing circuitry in a corresponding manner to allow observed path signatures to be captured and compared against the content of the hash tables 509 in a meaningful manner. The path signature generation circuitry 505 comprises interpolation circuitry 506, such that for each recorded time window of PMU events, missing entries can be inserted to allow the path signature generation to be based on equi-sampled events. Path signatures generated by the path generation circuitry 505 stored in the past signature storage 507, from where they are taken to be subjected to the defined hashing function (see the description of FIG. 4 above concerning the initialisation of this hashing function), and the results are stored in the hash tables 509.

Figure 6A:
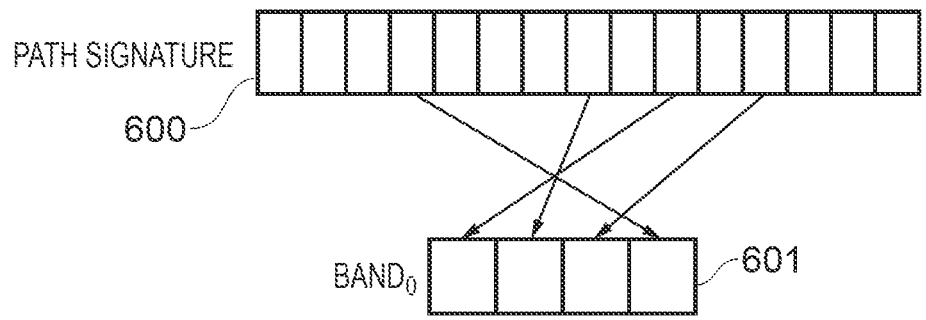
FIG. 6A schematically illustrates the randomised mapping of path signature elements into a selected band to be used in association with a particular hash table according to some example embodiments.

FIG. 6A schematically illustrates the randomised mapping of path signature elements into a selected band to be used in association with a particular hash table according to some example embodiments. As can be seen in the figure the path signature 600 comprises more elements than the band generated therefrom. The choice of the subset of the elements of the path signature which forms the band may be performed in various ways, but in an example embodiment the element indices for the band idx are generated by a randomised non-replacing selection from the available element indices of the path signature. The same selection process is used to select the path signature elements to be used in each of the bands (where the number of bands to be used is also an initialisation parameter).

Figure 6B:
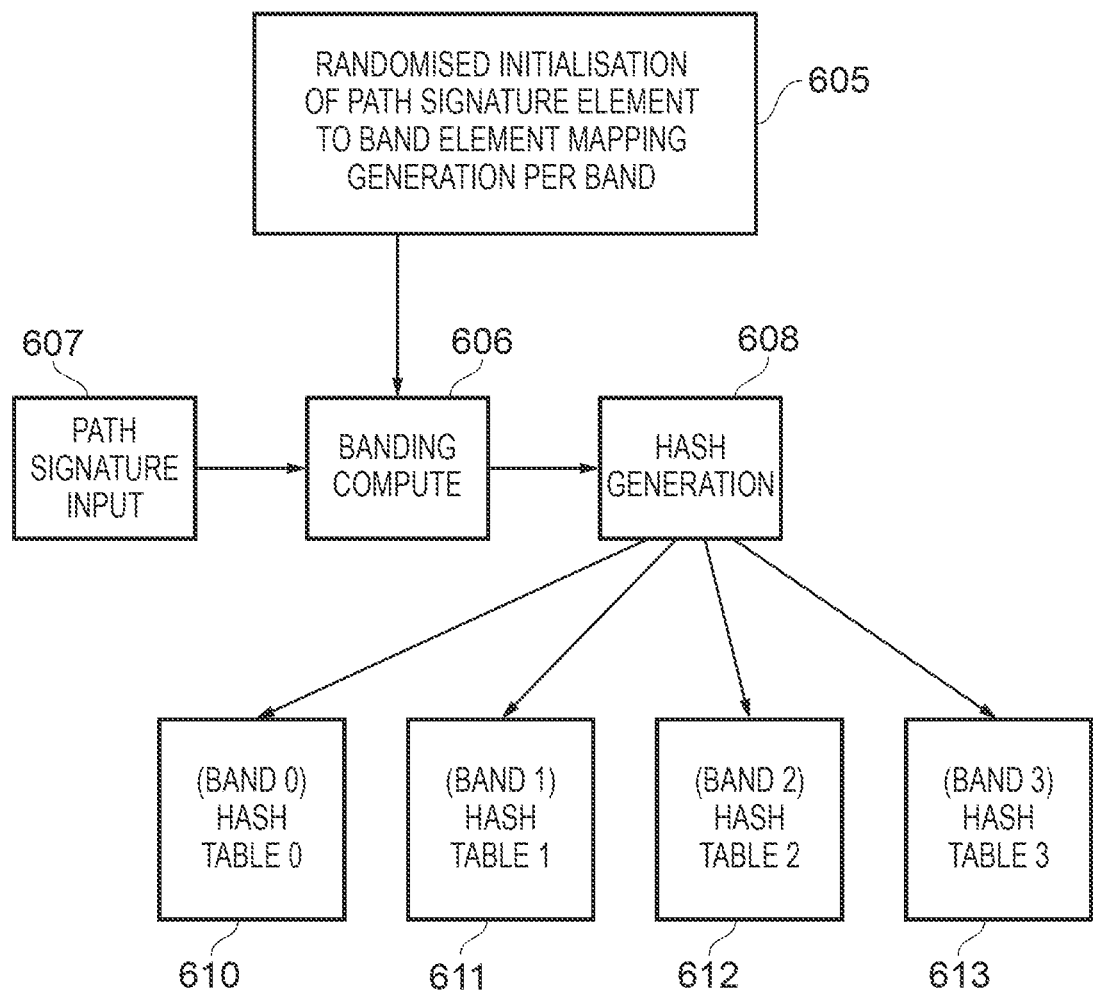
FIG. 6B schematically illustrates the manner in which hash tables are populated on the basis of path signature input and band definitions according to some example embodiments.

FIG. 6B schematically illustrates the manner in which hash tables are populated on the basis of path signature input and band definitions according to some example embodiments. Randomised initialisation of the mapping of path signature elements to band elements is performed at 605, setting up element mappings are per band. These element mappings provide one input to a banding compute step 606 into which the other input is the path signature to be processed 607. The banding compute step 606 determines the band "slices" of the path signature which are to be used for the hashing process. Thus calculated these bands are passed to the hash generation stage 608, which then applies a hash function to them in order to generate content of the respective hash tables. In the example of FIG. 6B a set of four hash tables 610-613 are shown, but this is merely for clarity of illustration and the present techniques are not limited to a particular number of hash tables. Note that (as labelled in the figure) there is one to one correspondence between the defined bands and the hash tables. It should be recognised here that various hashing schemes might be employed for the purpose of the populating the approximate nearest neighbour tables and searching them. Here for simplicity of description a locality sensitive hashing scheme with p-stable distributions is presented. These are universal hashes with a multiplier, w, sampled independently and identically distributed (IID) from a Gaussian distribution, using a positive hash divisor (quantisation factor), r, where the hash function applied to band idx of a path signature of depth D, $Sig_D(x)$, and with band count B in hash table depth P may be given by:

$$h(Sig_D(x)) = \left\lfloor \frac{w^T \cdot Sig_D(x)[band_{idx}]}{r} \right\rfloor \% P$$

where:

$$w \sim N\left(0, \frac{1}{B}\right) \mid w \in \mathbb{R}^B$$

Note that x strictly speaking is a tensor in the hashing function, but due to the structure of the path signature tensors the linear array representation may be treated as an unravelled vector in $\mathbb{R}^n$. Optionally an offset b in [0,r] may be applied, i.e. such that the hash function is then given by:

$$h(Sig_D(x)) = \left\lfloor \frac{w^T \cdot Sig_D(x)[band_{idx}] + b}{r} \right\rfloor \% P$$

Accordingly, each band has its own hash function and target hash table. Note that hash collisions are an integral feature of the locality sensitive hashing implementation, i.e. that in this context (where appropriate) hash collisions are explicitly wanted (since these represent matches between observed path signatures and a previously generated path signature in a given test). Further, inserts into the hash tables append (idx, test_id) to a linked list in the appropriate hash bucket, where test_id is a unique test identifier. For each path signature (s, idx, test_id, label), where s is the path signature identifier and label is a classification label (e.g. "fault", "fail", "error handling", "pass"), for each band i in s, the insert thus comprises: $h_i$(s[i]).append((idx, test_id)). Note that by storing test_id in the hash tables this supports the ability to query the hash tables and determine if a particular behaviour is, for example, in a known fail/fault state, which can be useful in a variety of dynamic malware monitoring contexts. At the conclusion of the process of generating the hash tables content, each hash table (hash map) produced is stored. This may for example comprise serialising each hash map and writing to an output file, in association with the banding pattern, the event capturing configuration data (PMU configuration, etc), and sliding time window metadata. The use of the band "slices" from the path signatures reduces the size and dimensionality of the data being processed and look-up times in the thus-generated hash tables are correspondingly reduced. Here lookup times are O(b.n+ E[len(collision_ll)]), where b is the number of bands, n is the number of elements of each band, and E is the expected length of the collision linked list. Note that the expected length of the collision linked list, which is can be tuned in (and predicted at) the hash table generation process described above.

Figure 7:
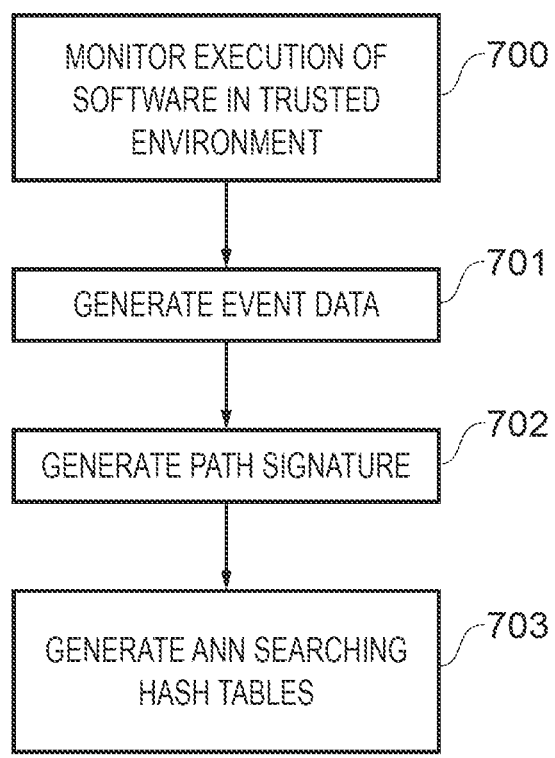
FIG. 7 is a flow diagram showing a sequence of steps which are taken according to the method of some example embodiments when monitoring the execution of software in a trusted environment.

FIG. 7 is a flow diagram showing a sequence of steps which are taken according to the method of some example embodiments when monitoring the execution of software in a trusted environment. At step 700 the execution of the software in a trusted environment is monitored and at step 701 event data characteristic of the behaviour of the software whilst executing in a trusted environment is generated. On the basis of this event data, at step 702 a path signature is generated, and at step 703 approximate nearest neighbour searching hash tables are generated in dependence on the path signature. These steps represent a high level description of the process by which approximate nearest neighbour (ANN) searching hash tables which capture behavioural signatures of the software when executing are generated. In one envisaged use case scenario, after these steps have been followed the software may then be made available to end users, whereby the ANN searching hash tables are provided in association with the software. The intention is then for these hash tables to be used by the end user's platform on which the software is executed, as is described in more detail below with reference to the figures which follow, in order for the behaviour of the executing software to be monitored and classified.

Figure 8:
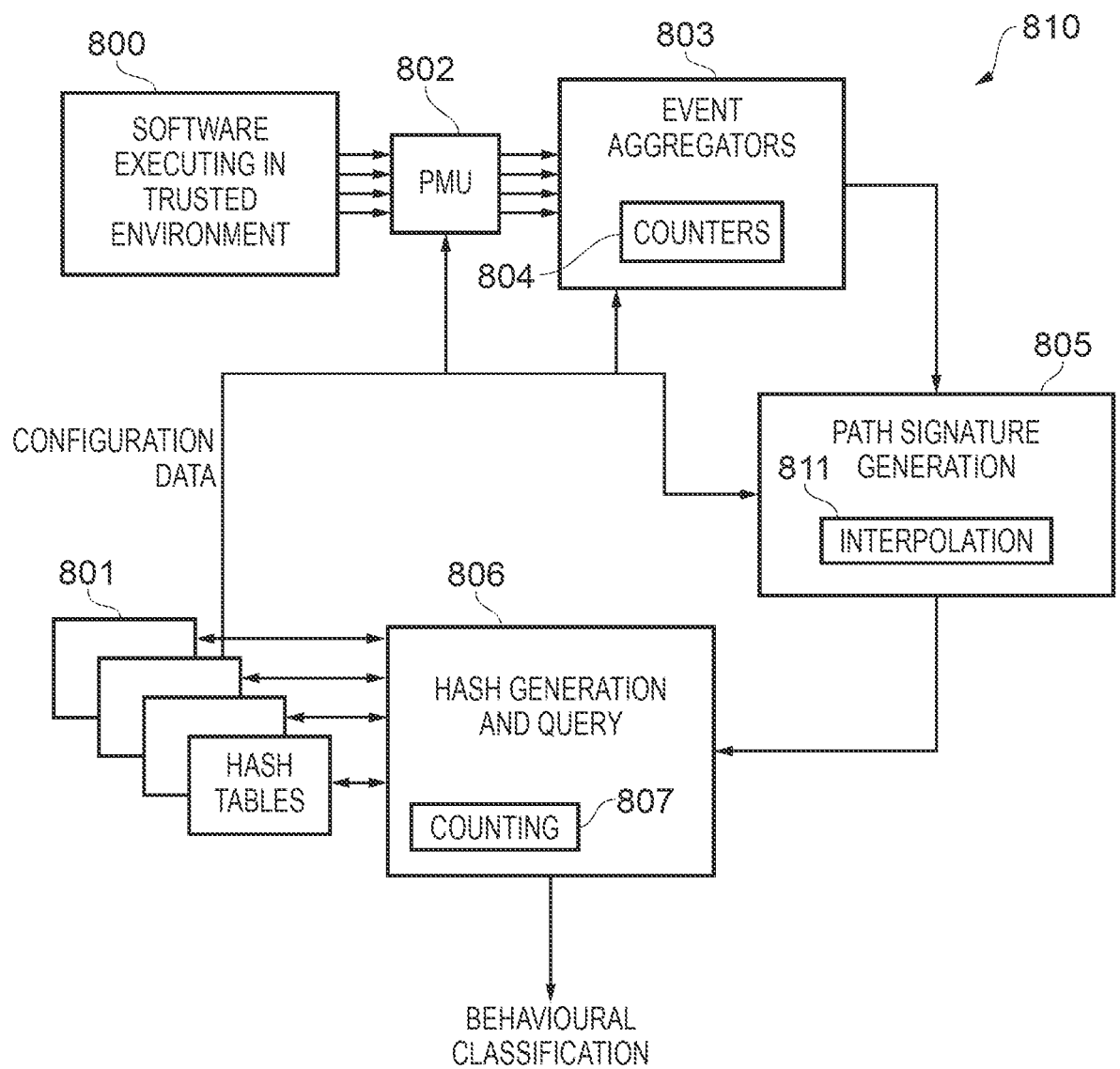
FIG. 8 schematically illustrates apparatus according to some example embodiments for monitoring the execution of software in a non-trusted environment and comparing an observed path signature against hash table content previously generated on the basis of the trusted execution.

FIG. 8 schematically illustrates apparatus 810 according to some example embodiments for monitoring the execution of software in a non-trusted environment and comparing an observed path signature against hash table content previously generated on the basis of the trusted execution. Accordingly apparatus 800 is a non-trusted entity and is operated under control of an end user. The disclosed techniques herein enable the apparatus 810 to monitor the execution of the software 800 executing in this non-trusted environment, such that the behaviour of the software can be classified and, if appropriate, remedial or defensive action can be taken. The hash tables 801 are provided with the configuration data defining the process by which they were generated (PMU settings, sliding window parameters etc.) and this configuration data is used in the apparatus 810 to configure the setup of the performance monitoring unit 802, the event aggregators 803, counters 804 associated with the event aggregators, the path signature generation circuitry 805, and the hash generation and query circuitry 806. Thus the apparatus 810 can configure its event capturing, path signature generation, and hashing circuitry in a corresponding manner to allow observed path signatures to be captured and compared against the content of the hash tables 801 in a meaningful manner. As in the case of the path signature generation circuitry 505 of FIG. 5, the path signature generation circuitry 805 comprises interpolation circuitry 811, such that for each recorded time window of PMU events, if required, missing entries can be inserted to allow the path signature generation to be based on equi-sampled events. An observed path signature generated by the path generation circuitry 805 is passed to the hash generation and query circuitry 806, which applies the defined hashing function, where this is also configured by the initialisation process described above with reference to FIG. 4, and where configuration parameters for the hash generation and query circuitry 806 are also provided in associated with the provided hash tables. The hash generation and query circuitry 806 queries each band's hash table for hash collisions. On the basis of the hash collisions observed, a behavioural classification is generated. Counting circuitry 807 is provided to support this determination. In this example the hash collision-based similarity is determined on the basis of a Jaccard similarity (i.e. intersection/union), which here is approximated by calculating the collision count divided by the number of hash tables. Appropriate threshold values are set against which this metric is compared. For example the behavioural classification can be determined as a positive identification when the metric exceeds a confidence threshold. Equally, below this (or below a separate threshold) the behavioural classification can be determined as a non-identification. Where the hash tables in this example are generated on the basis of multiple tests (which have aimed to provide a wide code coverage), the counting circuitry 807 can be employed to determine test_id duplications in the results, whereby when multiple hash collisions are determined across the bands (i.e. hash tables) for a given test_id, the greater confidence can be associated with the behavioural identification associated with a that test. In another style of identification example, the behavioural classification may be determined on the basis of multiple hash collisions corresponding to different tests, but where those tests correspond to a particular behaviour type (i.e. benign or malicious). Hence when hash collisions are found which predominately correspond to malicious behaviour example tests, this increases the confidence that the appropriate behavioural classification for the observed path signature is one of malicious behaviour.

Figure 9:
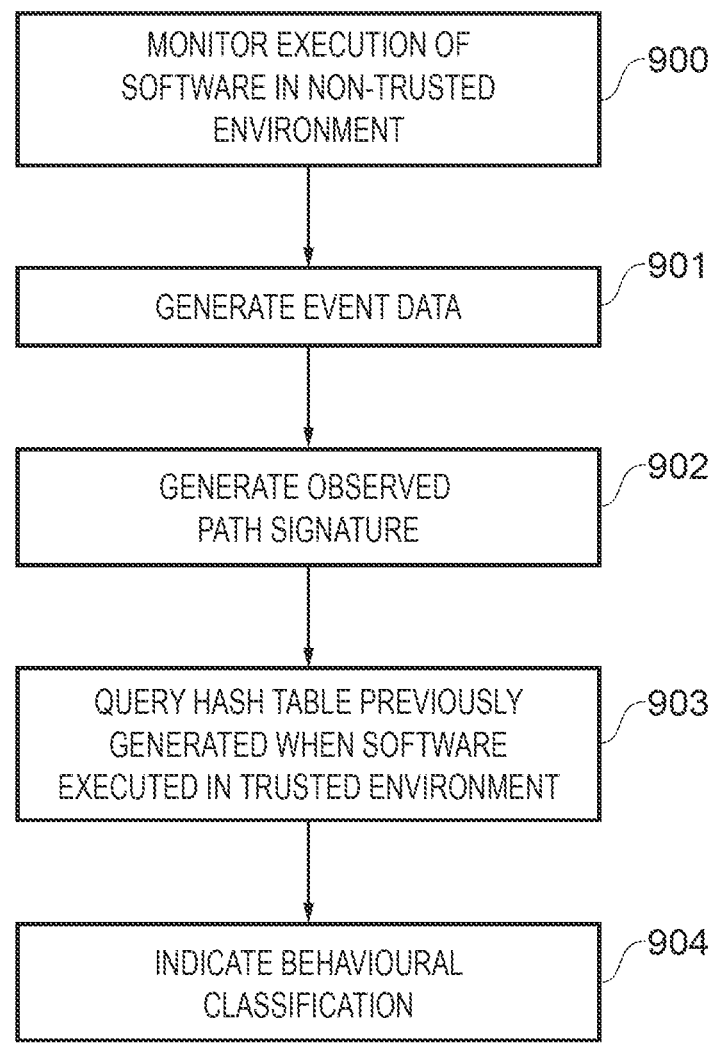
FIG. 9 is a flow diagram showing a sequence of steps which are taken according to the method of some example embodiments when monitoring the execution of software in a non-trusted environment.

FIG. 9 is a flow diagram showing a sequence of steps which are taken according to the method of some example embodiments when monitoring the execution of software in a non-trusted environment. At step 900 the execution of the software in the non-trusted environment is monitored and at step 901 event data characteristic of the behaviour of the software whilst executing in this non-trusted environment is generated. On the basis of this event data, at step 902 an observed path signature is generated and at step 903 approximate nearest neighbour searching hash tables (previously generated when the software was executed in a trusted environment) are queried with the observed path signature. On the basis of hash collisions in those hash tables, a behavioural classification is determined and is indicated at step 904. These steps represent a high level description of the process by which approximate nearest neighbour (ANN) searching hash tables in which behavioural signatures of the software when executing in a trusted environment are used to determine a behavioural classification for an observed path signature when the software is executing in a non-trusted environment.

Figure 10:
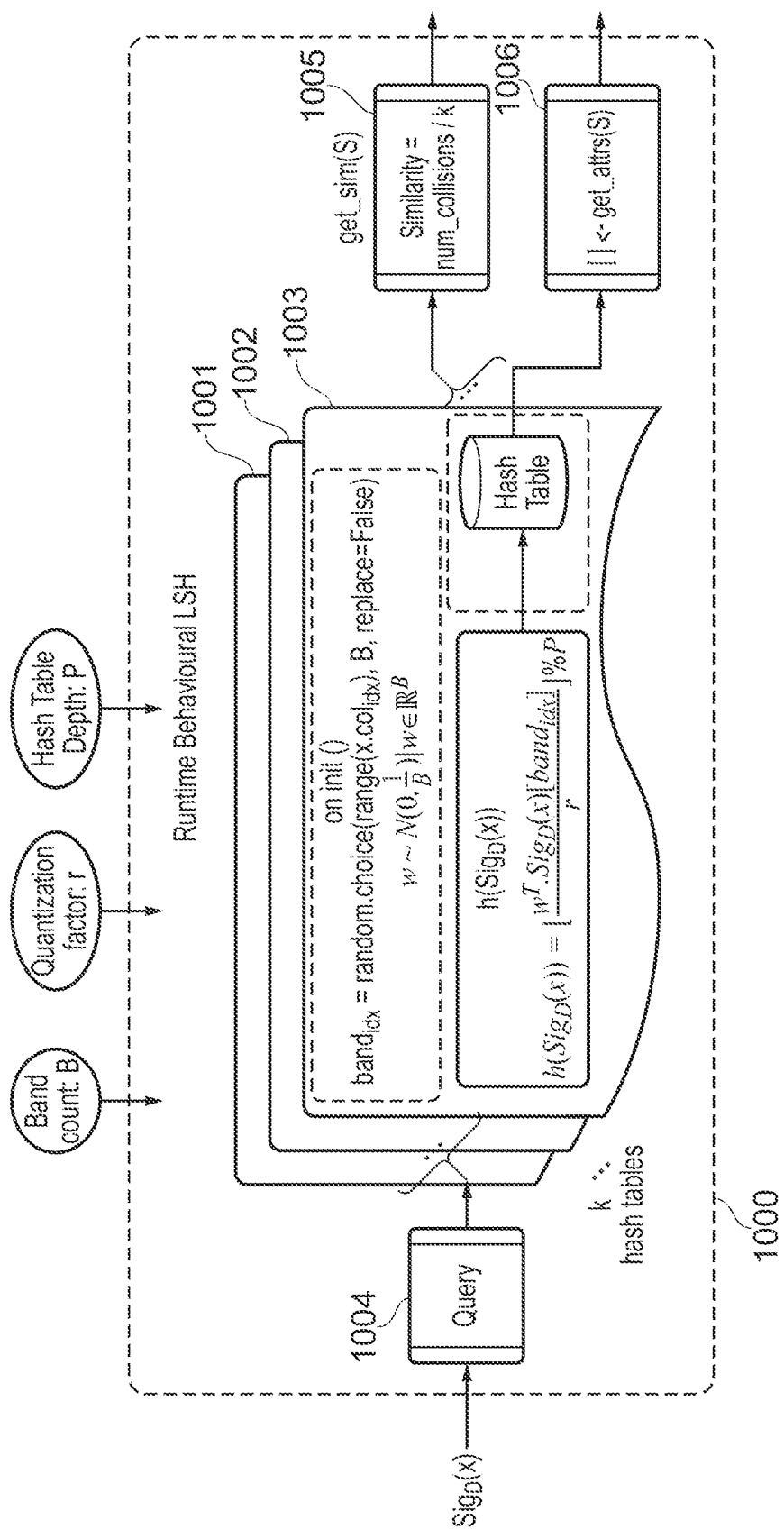
FIG. 10 schematically illustrates hash query circuitry and hash table storage comprising multiple hash tables in accordance with some example embodiments.

FIG. 10 schematically illustrates hash query circuitry 1000, comprising hash table storage comprising multiple hash tables 1001, 1002, 1003 in accordance with some example embodiments. The hash tables and hash function are configured by the provided initialisation parameters: band count B, quantization factor r, hash table depth P. As described in more detail above the respective bands $band_{idx}$ are initialised as a random subset choice of elements from the path signature structure, and a weighting w is sampled from a Gaussian distribution. A query function 1004 then queries the observed path signature $Sig_D(x)$ against the k hash tables 1001-1003 provided. Only three hash tables are shown here merely for clarity of illustration. The resulting hash collisions (or lack thereof) are used by the similarity function 1005 (as the ratio of the number of collisions to the number of hash tables k) to determine the similarity of the observed path signature $Sig_D(x)$ to the trusted test environment path signatures which were used to generate the content of the hash tables. A further look-up function get_attrs 1006 can extract the attributes stored in association with any entries in the hash tables (giving information about the tests in the trusted environment which generated this content).

Figure 11:
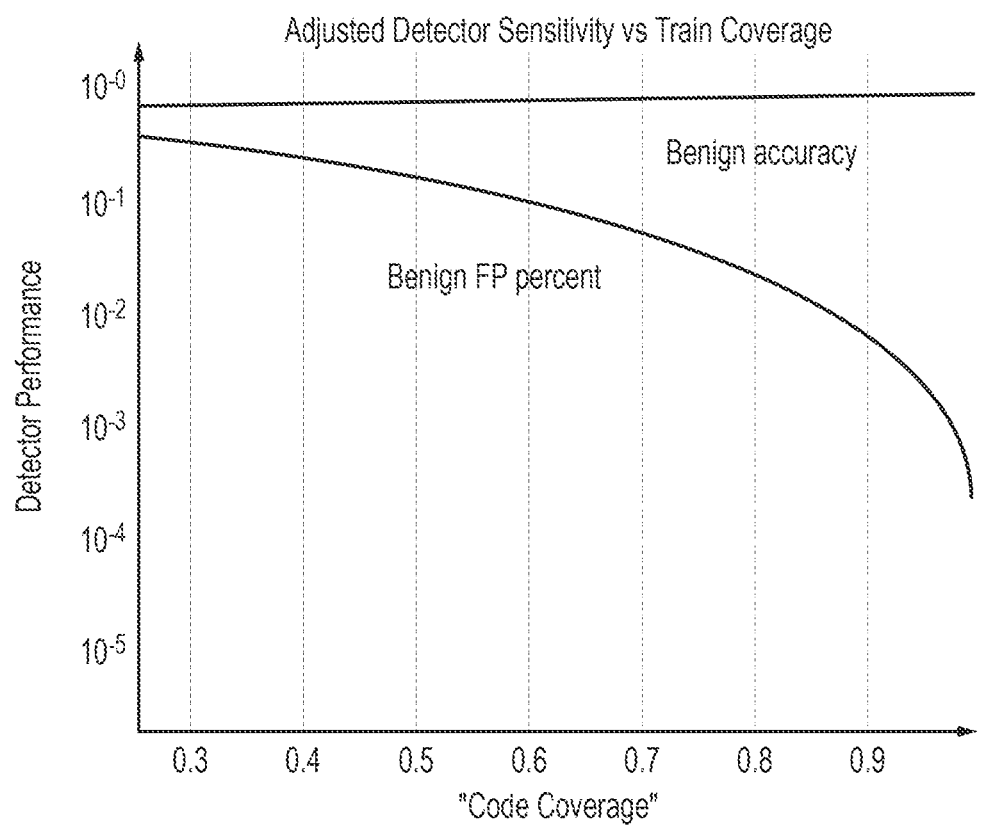
FIG. 11 shows the relationship between anomaly detection performance and training code coverage in terms of the benign activity identification accuracy rates and benign activity identification false positive rates in accordance with some example embodiments.

FIG. 11 shows the relationship between anomaly detection performance and training code coverage in terms of the benign activity identification accuracy rates and benign activity identification false positive rates in accordance with some example embodiments. These curves are indicative of results from implementations of the present techniques and show that very high accuracy rates (>99.9%) for identification of benign behaviours and very low false positive identification rates ($<10^{-4}$) can be achieved when trusted regression tests with good code coverage are used as the basis for the generation of the content of the hash tables. This is to be compared with the state-of-the-art for general anomaly detectors based on PMU events, which typically achieve ~80-95% classification accuracy and false positive rates of ~1-5%.

Figure 12:
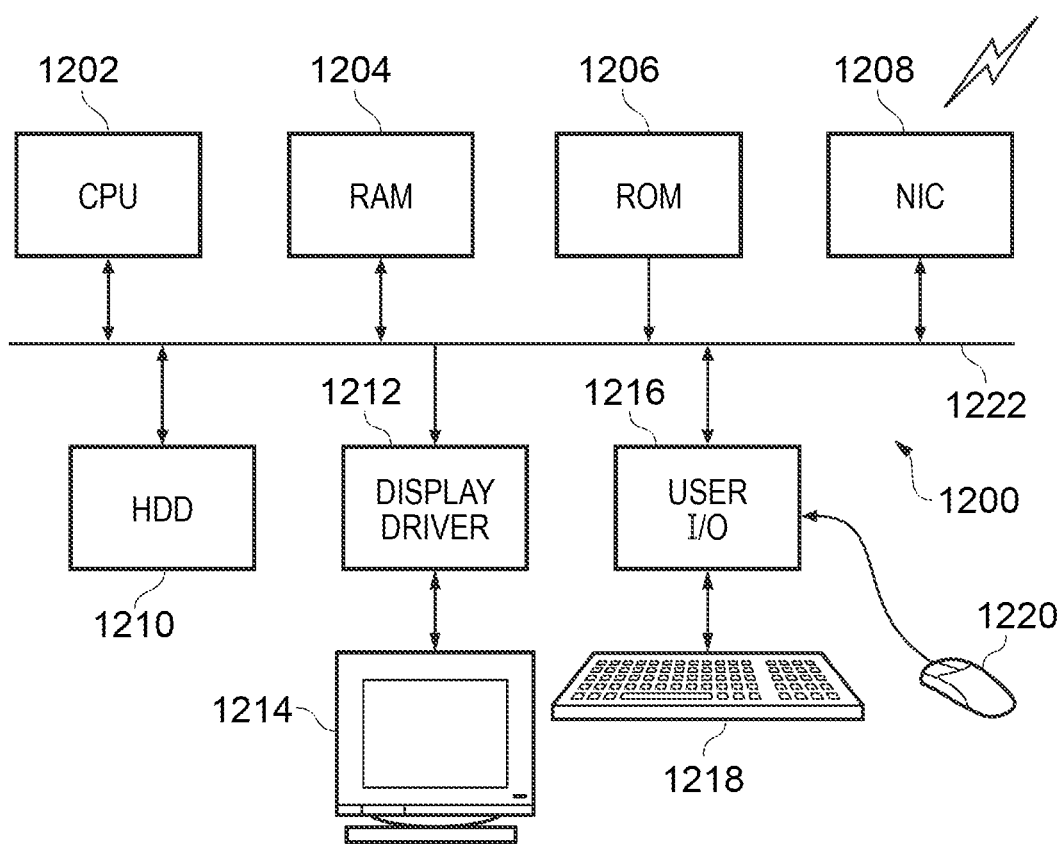
FIG. 12 schematically illustrates a general purpose computing device on which some example embodiments may be implemented.

FIG. 12 schematically illustrates a general purpose computing device on which some example embodiments may be implemented. The general purpose computer 1200 includes a central processing unit 1202, a random access memory 1204, a read only memory 1206, a network interface card 1208, a hard disk drive 1210, a display driver 1212 and monitor 1214 and a user input/output circuit 1216 with a keyboard 1218 and mouse 1220 all connected via a common bus 1222. In operation the central processing unit 1202 will execute computer program instructions that may be stored in one or more of the random access memory 1204, the read only memory 1206 and the hard disk drive 1210 or dynamically downloaded via the network interface card 1208. The results of the processing performed may be displayed to a user via the display driver 1212 and the monitor 1214. User inputs for controlling the operation of the general purpose computer 1200 may be received via the user input output circuit 1216 from the keyboard 1218 or the mouse 1220. It will be appreciated that the computer program could be written in a variety of different computer languages. The computer program may be stored and distributed on a recording medium or dynamically downloaded to the general purpose computer 1200. When operating under control of an appropriate computer program, the general purpose computer 1200 can perform some or all of the elements of the above described techniques and can be considered to form an apparatus for performing the above described techniques. Thus the monitoring of the software execution in the trusted environment may be administered using corresponding software on a device such as the general purpose computer 1200 and the execution of the software in the non-trusted environment may take place on a device such as the general purpose computer 1200. The architecture of the general purpose computer 1200 could vary considerably and FIG. 12 is only one example. Alternatively, the above-described techniques may be implemented in a more distributed fashion, wherein the general purpose computer 1200 illustrated in FIG. 12 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations, i.e. such configurations may be implemented, at least in part, in a cloud computing arrangement.

In brief overall summary, techniques, supported by corresponding apparatuses and methods, are disclosed for monitoring execution of software in a trusted environment and generating path signatures which are characteristic of the behaviour of the software. Multiple approximate nearest neighbour searching hash tables are generated in dependence on such path signatures and on attribute information defining behavioural classifications for the path signatures. Later execution of the software in a non-trusted environment is monitoring and an observed path signature characteristic of the behaviour of the software is generated. This observed path signature is queried against the multiple approximate nearest neighbour searching hash tables and a behavioural classification is determined in dependence on hash collision-based similarity between the observed path signature and the content of the multiple approximate nearest neighbour searching hash tables.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
event capturing circuitry to monitor execution of software in a trusted environment and to generate a series of event data in dependence on the execution of the software;
path signature generation circuitry to generate a path signature dependent on the series of event data and dependent on attribute information defining a behavioural classification for the path signature; and
hashing circuitry to generate multiple approximate nearest neighbour searching hash tables in dependence on the path signature.

2. The apparatus as claimed in claim 1, further comprising:
test administration circuitry to perform a test of execution of the software in the trusted environment, wherein the test comprises:
causing the event capturing circuitry to generate a time-window-specific series of event data in dependence on the execution of the software for a selected time window during execution of the software;
causing the path signature generation circuitry to generate a time-window-specific path signature from the time-window-specific series of event data and further comprising test-specific attribute information defining a behavioural classification for the test;
and path signature storage configured to store the time-window-specific path signatures generated by the path signature generation circuitry.

3. The apparatus as claimed in claim 2, wherein the test administration circuitry is configured to perform the test of execution of the software in the trusted environment for a sliding time window during execution of the software,
wherein the event capturing circuitry is configured to generate a sequence of time-window-specific series of event data for a sequence of selected time windows and the path signature generation circuitry is configured to generate a sequence of time-window-specific path signatures,
and the path signature storage is configured to store the time-window-specific path signatures in association with test-specific attribute information defining a behavioural classification for the test.

4. The apparatus as claimed in claim 3, wherein the test administration circuitry is configured to perform multiple tests, wherein the multiple tests are associated with a range of behavioural classifications.

5. The apparatus as claimed in claim 3, wherein the test administration circuitry is configured to cause the path signature storage to store the time-window-specific path signatures in association with a behaviour response indication for the test.

6. The apparatus as claimed in claim 1, wherein the hashing circuitry comprises:
band mapping circuitry to perform a banding process on the path signature to map a subset of elements of the path signature into a path band according to a predefined mapping,
wherein the band mapping circuitry is configured to perform multiple versions of the banding process using multiple predefined mappings to generate multiple path bands,
and wherein the hashing circuitry is configured to generate the multiple approximate nearest neighbour searching hash tables by hashing function to the multiple path bands.

7. The apparatus as claimed in claim 6, wherein the multiple predefined mappings are randomly generated as an initialisation step and are thereafter used by the hashing circuitry to generate the multiple approximate nearest neighbour searching hash tables.

8. The apparatus as claimed in claim 6, wherein a test administration circuitry is configured to cause the multiple approximate nearest neighbour searching hash tables to be stored in association with the multiple predefined mappings.

9. The apparatus as claimed in claim 2, wherein the test administration circuitry is configured to cause the multiple approximate nearest neighbour searching hash tables to be stored in association with event capturing configuration data.

10. The apparatus as claimed in claim 1, wherein the event capturing circuitry comprises event aggregation buffers to aggregate event counts over predetermined sampling periods, and the series of event data comprises a series of aggregated event counts.

11. The apparatus as claimed in claim 1, wherein the path signature generation circuitry is configured to interpolate between data items of the series of event data to generate any missing data items in the series of event data.

12. A method of data processing comprising:
monitoring execution of software in a trusted environment;
generating a series of event data in dependence on the execution of the software;
generating a path signature dependent on the series of event data and dependent on attribute information defining a behavioural classification for the path signature; and
generating multiple approximate nearest neighbour searching hash tables in dependence on the path signature.

13. Apparatus comprising:
event capturing circuitry to monitor execution of software in a non-trusted environment and to generate a series of event data in dependence on the execution of the software;
path signature generation circuitry to generate an observed path signature from the series of event data;
hash table storage configured to store multiple approximate nearest neighbour searching hash tables previously generated in dependence on path signatures generated when the software was executed in a trusted environment and on attribute information defining behavioural classifications for the path signatures; and
hash query circuitry to query the multiple approximate nearest neighbour searching hash tables with the observed path signature and to indicate a behavioural classification of the observed path signature in dependence on hash collision-based similarity between the observed path signature and content of the multiple approximate nearest neighbour searching hash tables.

14. The apparatus as claimed in claim 13, wherein the hash query circuitry comprises:
band mapping circuitry to perform a banding process on the observed path signature to map a subset of elements of the observed path signature into an observed path band according to a predefined mapping,
wherein the band mapping circuitry is configured to perform multiple versions of the banding process using multiple predefined mappings to generate multiple observed path bands,
and wherein the hashing circuitry is configured to receive the multiple predefined mappings in association with the multiple approximate nearest neighbour searching hash tables.

15. The apparatus as claimed in claim 13, wherein the hash query circuitry is configured to determine the hash collision-based similarity in dependence on a collision count of hash collisions between the observed path signature and a multiplicity of the multiple approximate nearest neighbour searching hash tables.

16. The apparatus as claimed in claim 15, wherein the hash query circuitry is configured to indicate the behavioural classification of the observed path signature in dependence on the collision count.

17. The apparatus as claimed in claim 16, wherein the hash query circuitry is configured to indicate the behavioural classification as positive identification when the collision count exceeds a first count threshold and to indicate the behavioural classification as non-identification when the collision count is below a second count threshold.

18. The apparatus as claimed in claim 16, wherein the hash query circuitry is configured to determine a multiple identifier count from hash collisions found between the observed path signature and contents of the multiple approximate nearest neighbour searching hash tables, wherein the multiple identifier count indicates numbers of duplicate test identifiers for the hash collisions,
and to indicate the behavioural classification of the observed path signature in dependence on the multiple identifier count.

19. The apparatus as claimed in claim 14, wherein the hash query circuitry is configured to indicate the behavioural classification of the observed path signature in further dependence on attribute information defining behavioural classifications for the path signatures stored in the multiple approximate nearest neighbour searching hash tables.

20. A method of data processing comprising:
monitoring execution of software in a non-trusted environment;
generating a series of event data in dependence on the execution of the software;
generating an observed path signature from the series of event data;
querying with the observed path signature multiple approximate nearest neighbour searching hash tables previously generated dependent on path signatures generated when the software was executed in a trusted environment and dependent on attribute information defining behavioural classifications for the path signatures; and indicating a behavioural classification of the observed path signature in dependence on hash collision-based similarity between the observed path signature and content of the multiple approximate nearest neighbour searching hash tables.

* * * * *